United States Patent [19]

De Toffol et al.

[11] 4,404,338

[45] Sep. 13, 1983

[54] PROCESS FOR PREPARING COPOLYMERS OF VINYL-AROMATIC MONOMERS WITH ETHYLENICALLY UNSATURATED NITRILES HAVING LOW CONTENT OF UNREACTED RESIDUAL MONOMERS

[75] Inventors: Andrea De Toffol, Cerro Maggiore; Nicola Anfossi, Busto Arsizio; Gianfranco Veroli, San Donato Milanese, all of Italy

[73] Assignee: Montedison S.p.A., Milan, Italy

[21] Appl. No.: 279,581

[22] Filed: Jul. 1, 1981

[30] Foreign Application Priority Data

Jul. 2, 1980 [IT] Italy ................................ 23182 A/80

[51] Int. Cl.$^3$ ............................................ C08F 212/10
[52] U.S. Cl. ..................................... 526/86; 525/242; 525/309; 525/311; 526/87; 526/329.2; 526/331; 526/342
[58] Field of Search .................... 526/86, 87, 342, 331, 526/329.2; 525/242, 309, 311

[56] References Cited

U.S. PATENT DOCUMENTS

| | | |
|---|---|---|
| 3,738,972 | 6/1973 | Moriyama et al. ................. 526/342 |
| 3,954,910 | 5/1976 | Kropp et al. ........................ 526/342 |
| 3,965,079 | 6/1976 | Console et al. ..................... 526/342 |
| 3,987,235 | 10/1976 | Fujimoto ............................ 526/342 |
| 3,998,797 | 12/1976 | Brandli et al. ..................... 526/342 |
| 4,013,739 | 3/1977 | Bracke et al. ...................... 526/342 |
| 4,068,064 | 1/1978 | Platt et al. ......................... 526/342 |
| 4,197,400 | 4/1980 | Wollrab et al. ..................... 526/342 |
| 4,200,593 | 4/1980 | van der Loos et al. ............. 526/342 |
| 4,241,203 | 12/1980 | Wensel et al. ...................... 526/342 |
| 4,268,652 | 5/1981 | Kent .................................. 526/342 |
| 4,294,946 | 10/1981 | Minematsu et al. ................ 525/242 |

FOREIGN PATENT DOCUMENTS 419 1/1979 European Pat. Off. .

Primary Examiner—Harry Wong, Jr.

[57] ABSTRACT

Process for preparing copolymers of vinyl-aromatic monomers with ethylenically unsaturated nitriles having a very low content of unreacted residual monomers, consisting in adding to the polymerization dispersion, containing a compound capable of giving free radicals, and in the final step of the polymerization process, from 0.2 to 2% by weight of a comonomer which is reactive towards the unreacted monomers.

9 Claims, No Drawings

PROCESS FOR PREPARING COPOLYMERS OF VINYL-AROMATIC MONOMERS WITH ETHYLENICALLY UNSATURATED NITRILES HAVING LOW CONTENT OF UNREACTED RESIDUAL MONOMERS

THE PRIOR ART

The copolymerization process in aqueous dispersion of vinyl-aromatic monomers with ethylenically unsaturated nitriles is well known and industrially applied on a commercial scale.

The products obtained by the known copolymerization processes exhibit, however, the drawback of having a high content of residual unpolymerized monomers.

The presence of unpolymerized monomers, as is known, adversely affects the thermal properties of the obtained copolymer and the appearance of the manufactured articles.

Furthermore, the unpolymerized monomers are generally released during the subsequent treatments of the products such as: coagulation, filtration, drying, hot mixing and molding.

The removal of such unreacted monomers and in particular of the vinyl-aromatic monomers, such as alpha-methyl-styrene, is very diffecult due to their high solubility in the polymer and high boiling point.

Several methods have been studied and employed with a view to reducing the content of unreacted monomers. It has been suggested, for example, to treat the polymerization slurry with steam in order to strip the unreacted monomers. This treatment is effective only when extended over a certain time-period, but in practice it results to be expensive due to the necessary investments and to the high energy requirements. The same drawbacks exist if stripping of the monomers is carried out during the coagulation step.

It has been also suggested to eliminate the unreacted monomers by melting of the polymer in an extruder and by successive degassing by means of conveyance through a chamber under vacuum.

The drawback of this process consists in that particular extruders having under vacuum degassing chambers would be necessary to attain a satisfactory removal of the unreacted monomers. Such machines, besides being expensive, have also a low capacity.

The published European patent application No. 419 suggests to solve the problem of the residual monomers by adding to the polymerization agent an additional amount of a compound yielding free radicals. The addition of such compound is effected when the conversion rate is less than 15% per hour, the conversion degree is higher than 75%, the addition of the monomers is concluded and the polymerization medium contains at least 0.1% by weight, referred to the starting monomers, of unsaturated non-converted nitrile.

Such process, although effective, does not allow to obtain a reduction of the residual monomers to an acceptable level, wherefore it is necessary, for many applications, to carry out a successive devolatilization treatment on the latexes obtained.

THE PRESENT INVENTION

An object of the present invention is to provide a polymerization process which enables to obtain polymers having a low content of residual monomers directly during polymerization, with very high conversion yields.

Another object of this invention is to provide a process in which the residual unpolymerized monomers, especially the alpha-methyl-styrene monomers, can be easily converted into polymers without employing stripping or devolatilization methods which involve a successive expensive recovery due to ecological reasons.

It is a further object of the present invention to solve the problem of the residual monomers without adversely affecting the properties of the polymer obtained.

This and other objects are achieved by adding to the polymerization dispersion, which contains a compound capable of giving free radicals, and in the final step of the polymerization process, an amount ranging from 0.2 to 2% by weight, referred to the starting monomers, of a comonomer which is particularly reactive towards unreacted monomers.

The reactive comonomer is added when at least 70% and preferably about 95% of the starting monomers have been converted into polymer.

The compound yielding free radicals can be added to the polymerization medium either gradually in the whole course of the polymerization, or partially at the beginning and partially either during the polymerization process or in the final step thereof.

The amount of compound yielding free radicals in the polymerization medium, at the time of the addition of the reactive comonomer, ranges from 0.01 to 0.5% by weight in respect of the starting monomers. The essential feature of the process described hereinabove and forming the object of this invention is the simultaneous presence of the reactive comonomer and of the compound releasing free radicals, in the amounts above-specified, in the final step of the polymerization process. In fact, such simultaneous presence permits to drastically reduce the content of residual monomers to negligible values, without altering the overall characteristics of the final polymer. Furthermore, neither secondary cross-linking reactions between monomers and polymer, nor formation of low molecular weight polymers occur. Such drastic reduction of the content of residual monomers cannot be achieved when the compound yielding free radicals is added only at the beginning of polymerization. Consequently, the modalitites according to which the reactive comonomer and the free radical-releasing compound are added are of great importance for obtaining the desired effect.

According to the present invention, when the conversion degree has reached a value exceeding 70% and preferably of about 95%, exactly calculated amounts of a third comonomer are added to the polymerization medium containing a free radical-releasing compound.

The third comonomer is selected from those which are highly reactive with the residual monomers and the homopolymer thereof has a glass transition temperature (Tg) as close as possible to the one of the final copolymer.

Some monomers which meet such conditions are for example: vinyl acetate, esters of acrylic acid and of methacrylic acid, such as methyl-acrylate, ethyl-acrylate, methyl-methacrylate, ethyl-methacrylate; styrene, methacrylonitrile or mixtures thereof. In practice it has been found that the best results are obtained by using styrene or methyl-acrylate.

According to the present invention, during the addition of the third monomer, a well determined amount of a free radical-yielding compound is present in the reaction mass.

As free radical-yielding compound may be used any known initiator for the copolymerization in an aqueous dispersion of vinyl-aromatic monomers with ethylenically unsaturated nitriles, including both the water-soluble and the oil-soluble initiators.

Examples of water-soluble initiators are the persalts of potassium, of sodium or of ammonium such as persulphates, perborates, peracetates, percarbonates, etc.; peroxides of alkaline metals and hydrogen peroxide, employed either alone or activated with a reducing agent so as to form a redox system.

Examples of oil-soluble initiators are the organic peroxides or hydroperoxides, such as di-ter.butyl-peroxide, benzoyl-peroxide, lauroyl-peroxide, dicumyl-peroxide, ter.butyl-peroxide, ter.butyl-hydroperoxide, cumene hydroperoxide, di-isopropyl-benzene-hydroperoxide, methyl-cyclohexyl-hydroperoxide etc. activated with reducing agents such as the low valence sulphur compounds, for example sodium-formaldehyde sulphoxylate, sodium bisulphite or pyrosulphite, etc., dextrose, organic bases such as tri-ethanolamine, etc. and a metal salt such as ferrous sulphate, ferric nitrate, etc.

In practice, as a compound capable of yielding free radicals it is preferable to use a catalytic redox system consisting of:
  an oil-soluble initiator in an amount ranging from 0.05 to 1% by weight and preferably from 0.1 to 0.5% by weight, referred to the mixture of starting monomers;
  a reducing agent selected from amongst the ones mentioned hereinabove, in an amount ranging from 0.01 to 0.5% by weight and preferably from 0.1 to 0.3% by weight referred to the mixture of starting monomers, and
  from 0.0005 to 0.03% by weight and preferably from 0.002 to 0.02% by weight, referred to the mixture of starting monomers, of an above-mentioned metal salt.

The action of the free radical-yielding compound results particularly enhanced if such compound is added in part at the beginning of the polymerization and in part during the final step of the reaction and gradually over a stretch of time of from 1 hour to 3 hours.

In the reaction final step and preferably at the time when the reactive comonomer is being added, the reaction temperature is maintained sufficiently high, preferably above 60° C. Temperature of form 70° to 90° C. are preferred.

The polymerization process object of the present invention is conducted in an aqueous dispersion. "Aqueous dispersion" means both the emulsion and the suspension. The polymerization in emulsion is preferred in practice. In the polymerization medium the water/monomers ratio may vary in a wide range, being generally comprised between 4:1 and 1.6:1, preferably from 2.5:1 to 1.8:1.

The auxiliary substances usually necessary to effect such type of polymerization, such as acid or alkaline surfactants optionally buffer salts, catalysts and molecular weight regulators, are added to the polymerization medium.

Suitable surfactants are: the alkaline salts or the ammonium salts of fatty acids, such as lauric acid, oleic acid and the stearic acid, of dismuted resinic acids, of sulphonated fatty acids, of alkyl- or alkyl-aryl-sulphonic acids, of alkyl-sulphonic esters, of sulphuric and phospheric acid esters, etc.

As molecular weight regulators use is generally made of mercaptans, such as ter.dodecyl-mercaptan, n-octyl-mercaptan, etc., or of terpenes such as terpinolene, or dimers of alpha-methyl-styrene.

Polymerization may be carried out in an acid or basic medium with a pH range of from 2 to 10, preferably of from 3 to 8, and in isothermal conditions at temperatures ranging from 60° to 100° C. and preferably from 70° to 90° C., or in adiabatic conditions with a thermal cycle ranging from 20° to 100° C., preferably from 25° to 90° C.

The term "vinyl-aromatic monomers", whenever used in the present description and in the attached claims, comprise: styrene, alpha-alkyl-mono-vinylidene-aromatic compounds such as alpha-methyl-styrene, alpha-ethyl-styrene, alpha-methyl-vinyl-toluene, alpha-methyl-di-alkyl-styrene, etc.; styrene alkyl-substituted in the nucleus such as vinyl-toluene, o.ethyl-styrene, p.ethyl-styrene, 2,4-di-methyl-styrene, etc.; styrene halogen substituted in the nucleus such as o.chloro-styrene, 2-chloro-4-methyl-styrene, 2,6-di-chloro-4-methyl-styrene, etc.

The side alkyl groups may contain from 1 to 4 carbon atoms. Said vinly-aromatic monomers can be employed either alone or in admixture with one another in any desired ratio.

The term "ethylenically unsaturated nitriles" comprises, first of all, acrylonitrile. Also methacrylonitrile, ethacrylonitrile and mixtures thereof can be advantageously employed.

Besides the above-cited monomers, also alkyl esters of the acrylic acid and of the methacrylic acid an mixtures thereof can be added.

The mixture of monomers to be polymerized may contain from 65 to 80 parts by weight of a vinyl-aromatic monomer and, accordingly, from 35 to 20 parts by weight of ethylenically unsaturated nitrile. In practice it is preferable to operate with monomer mixtures close to the azeotropic composition.

The following examples are given for illustrative purposes and for a better comprehension and practice of the invention, without being however a limitation thereof.

In the examples all the parts are to be understood as parts by weight, unless otherwise specified.

EXAMPLE 1

A catalytic system composed by:
  0.5% by weight, referred to the monomers, of cumene hydroperoxide,
  0.28% by weight, referred to the monomers, of sodium formaldehyde sulphoxylate, and
  0.005% by weight, referred to the monomers, of ferrous sulphate, was introduced into a 20 l reactor containing an aqueous emulsion consisting of:
    200 parts of water,
    100 parts of a mixture of alpha-methyl-styrene and acrylonitrile in a weight ratio of 72:28,
    1.5% by weight, referred to the monomers, of an alkyl-sulphonated surfactant,
    a mercaptan as regulator of the polymer molecular weight, and
    sulphuric acid in such amount as to bring the emulsion pH to about 3.

The reaction was conducted adiabatically starting from 25° C. After reaching the maximum temperature (about 85° C.), the reaction mass was maintained at such temperature for about 2 hours. The content of residual monomers determined by means of the gas chromatographic method on the polymer so obtained is recorded on Table I. The resulting polymer was coagulated in hot conditions, under pressure, in a calcium chloride solution, according to the known process, then it was filtered, repeatedly washed with water and dried in an oven at 70° C. up to constant weight. The chemical-physical, physical-mechanical and thermal characteristics determined on the polymer after degassing the latex with steam and having an alpha-methyl-styrene content of 1350 ppm and an acrylonitrile content of 230 ppm, are recorded on Table II.

EXAMPLE 2

Example 1 was repeated by adding the same amount of the catalytic system under the following conditions: 50% by weight of the total amount precharged at the beginning and the remaining 50% continuously fed for 4 hours and 30 minutes.

After a further 30 minute dwell time at about 85° C, the polymer was coagulated, filtered, washed and dried under the same conditions as in example 1. The content of residual monomers is recorded on Table I, and the chemical-physical, physical-mechanical and thermal characteristics of the polymer obtained are recorded on Table II.

EXAMPLES 3, 4 AND 5

It was operated as in example 2, adding, in one time only, 1.5% by weight, referred to the starting monomers, of methyl acrylate, of methacrylonitrile and of styrene respectively, when the polymerization conversion was of about 95%. The content of residual monomers of each polymer obtained is recorded on Table I, and the chemical-physical, physical-mechanical and thermal characteristics of each polymer are recorded on Table II.

EXAMPLES 6, 7 AND 8

Example 1 was repeated adding the same amount of the catalytic system under the following conditions: 60% by weight at the beginning of the reaction and the remaining 40% in two hours starting when the polymerization conversion was of 95.5%.

At such conversion, also 1.5% by weight, referred to the monomers, of methyl acrylate, of methacrylonitrile and of styrene respectively were added in one time only.

Tables I and II respectively show the content of residual monomers and the chemical-physical, physical-mechanical and thermal characteristics of each polymer obtained.

TABLE I

| | RESIDUAL MONOMERS IN THE LATEX | | | | |
|---|---|---|---|---|---|
| Example No. | Alpha-methyl styrene ppm | Acrylonitrile ppm | Methyl-acrylate ppm | Methacrylonitrile ppm | Styrene ppm |
| 1 | 8080 | 1940 | — | — | — |
| 2 | 3000 | 60 | — | — | — |
| 3 | 620 | 170 | 450 | — | — |
| 4 | 980 | 740 | — | 780 | — |
| 5 | 1030 | 40 | — | — | 130 |
| 6 | 500 | 120 | 300 | — | — |
| 7 | 850 | 600 | — | 600 | — |
| 8 | 800 | 20 | — | — | 70 |

TABLE II

| Characteristics | Examples | | | | |
|---|---|---|---|---|---|
| | 1 | 2 | 5 | 7 | 8 |
| Inherent viscosity in dl/g at 22° C. in dimethylformamide measured by a Bishoff-Deusreux viscosimeter | 0.54 | 0.53 | 0.54 | 0.545 | 0.54 |
| Tensile yield strength in Kg/cm$^2$ (ASTM D 638/68) | 730 | 760 | 750 | 760 | 740 |
| Tensile elasticity modulus in Kg/cm$^2$ (ASTM D 638/68) | 38,700 | 38,900 | 39,000 | 39,100 | 38,800 |
| Rockwell hardness (ASTM A 785/65) | 87 | 87 | 87 | 87 | 87 |
| Impact strength CHARPY, without notch - thickness ¼", in Kg cm/cm$^2$ (ISO R 179) | 27 | 26 | 27 | 28 | 26 |
| Vicat degree at 1 Kg. in °C. (ASTM 1525/65) | 128 | 128 | 128 | 128 | 128 |
| Vicat degree at 5 Kg. in °C. (ASTM 1525/65) | 123 | 123 | 123 | 123 | 123 |
| HDT at 18.5 Kg. and 264 psi in °C. (ASTM 648/56) | 110 | 110 | 109 | 110 | 110 |

What we claim is:

1. A process for preparing copolymers of vinyl-aromatic monomers with ethylenically unsaturated nitriles as starting monomers, which copolymers have a very low content of unreacted residual monomers, said process comprising polymerizing the mixture of starting monomers in an aqueous dispersion and, when at least 70% of the starting monomers have been converted to polymer, adding from 0.2% to 2% by weight, referred to the starting monomers, of another, different monomer reactive towards the unreacted starting monomers and selected from the group consisting of vinyl acetate, esters of acrylic acid, esters of methacrylic acid, styrene, methacrylonitrile and mixtures thereof, the aqueous dispersion containing, at the time of the addition of the monomers reactive with unreacted starting monomers, from 0.1 to 0.5% by weight of a compound capable of yielding free radicals.

2. A process according to claim 1, wherein the comonomer reactive towards the unreacted starting monomers is added when about 95% of the starting monomers have been converted into polymer.

3. A process according to claim 1, wherein the free radical-yielding compound is gradually added to the polymerization medium during the whole course of the polymerization.

4. A process according to claim 1, wherein the free-radical yielding compound is added in part at the beginning and in part in the final step of the polymerization process.

5. A process according to claim 4, wherein the free radical-yielding compound is added in part at the beginning of polymerization and in part in the final step of reaction, gradually over a time period ranging from 1 to 3 hours.

6. A process according to claim 1, wherein the reactive comonomer is selected from the group consisting of styrene, methyl acrylate and methacrylonitrile.

7. A process according to claim 1, wherein, in the final step of the reaction and at the time of the addition of the comonomer reactive towards unreacted and starting monomers, the reaction temperature is higher than 60° C.

8. A process according to claim 7, wherein the reaction temperature is from 70° C. to 90° C.

9. A process according to claim 1, in which the comonomer reactive towards the unreacted starting comonomers is selected from those the homopolymers of which have a glass transition temperature as close as possible to the glass transition temperature of the final copolymer.

* * * * *